United States Patent Office 2,734,048
Patented Feb. 7, 1956

2,734,048

PRODUCTION OF POLYVINYL ALCOHOL

John E. Bristol, Niagara Falls, and Walton B. Tanner, Grand Island, N. Y., assignors to E. I. du Pont de Nemours and Company, Wilmington, Del., a corporation of Delaware No Drawing. Application April 30, 1953, Serial No. 352,277

18 Claims. (Cl. 260—91.3)

This invention relates to the production of polyvinyl alcohol by the alcoholysis of a polyvinyl ester.

This application is a continuation-in-part of copending application Serial No. 157,641 filed April 22, 1950, now abandoned.

It is known to produce polyvinyl alcohol by reacting a polyvinyl carboxylic acid ester such as polyvinyl acetate with a hydrolytic alcohol such as ethanol or methanol in the presence of an alcoholysis catalyst which may be a strong acid or a strong base. This may be accomplished by merely mixing the catalyst with an alcoholic solution of the polyvinyl ester at room temperature or at temperatures up to the boiling point. By using a sufficiently large proportion of the alcohol, in which polyvinyl alcohol is insoluble, the product is precipitated as a slurry in the excess alcohol. At the end of the reaction the mixture also will contain the corresponding carboxylic acid ester in amount equivalent to the polyvinyl ester reacted. In carrying out the reaction with an alkali metal alcoholate or similar alkaline catalyst at elevated temperatures, e. g., from 40° C. to the boiling point, difficulty is often encountered by the formation of a yellow to brown color in the resulting polyvinyl alcohol product. By reducing the temperature, particularly to around room temperature, the formation of such color can be minimized but under such conditions the reaction is slower and a larger amount of catalyst is required. Another difficulty encountered relates to the formation of a viscous gel as the polyvinyl ester undergoes alcoholysis. During this gel formation stage the reaction mixture must be agitated and this requires heavy stirring equipment and expenditure of much power.

An object of the present invention is to provide an improved process for reacting a polyvinyl ester with an alcohol to produce polyvinyl alcohol. A further object is the production of polyvinyl alcohol which is substantially free from discoloration. A still further object is the avoidance of gel formation or the minimizing of the effects resulting from the formation of the viscous gel during the alcoholysis stage. Another object is to provide an improved continuous process for the production of polyvinyl alcohol. Still other objects will be apparent from the following description of the invention.

The above objects may be attained in accordance with the present invention by reacting a polyvinyl ester with an alcohol in the presence of an alkali metal alcoholate catalyst substantially at the boiling point of the reaction mixture. The alcohol and ester vapors may in part be removed from the boiling mixture while the polyvinyl alcohol is removed from the reactor as a suspension in liquid reaction medium composed largely of alcohol and ester. In carrying out this process we provide sufficient alcohol so that the polyvinyl alcohol as produced forms an easily manageable slurry or suspension in the liquid medium. The rate of addition of the polyvinyl ester is such that the amount in the boiling alcoholysis reaction medium at any given moment never constitutes more than about 1% by weight of the reaction medium and sufficient alkaline catalyst must also be present so that the rate of alcoholysis will be rapid and undesirable gel formation avoided or greatly minimized. Preferably, the reaction is carried out in a continuous manner whereby the polyvinyl ester and alcohol, e. g., as an alcoholic solution of the polyvinyl ester, are continuously added to a reaction vessel to which an alcoholic solution of the catalyst is likewise continuously added, the vessel being heated so as to maintain the reaction mixture at its boiling point at about atmospheric pressure. The vapors resulting from the boiling solution may be led off and preferably are condensed and recovered as a liquid, which is not returned to the reaction vessel. Preferably the reaction mixture is continuously stirred and the reaction mixture containing suspended polyvinyl alcohol continuously flows out of the reaction vessel and is filtered to recover polyvinyl alcohol therefrom.

Our invention can perhaps be better appreciated by considering what happens during alcoholysis of a polyvinyl ester in organic solvent composed in large part of alcohol and in the presence of catalyst. As the polyvinyl acetate molecule undergoes the loss of acetate groups by replacement with hydroxyl groups during alcoholysis the molecule passes from high solubility in the solvent to practically complete insolubility. Up to about 45% replacement of acetate groups by hydroxyl groups the solubility is such as to produce no gel but after about 45% replacement in the molecule has taken place gel formation starts and continues to form until about 75% replacement. After about 75% replacement by hydroxyl groups the molecule becomes practically insoluble and remains so up to complete alcoholysis. Gel formation does not take place as alcoholysis proceeds above about the 75% replacement stage. We have discovered that if the concentration of the solvent soluble polyvinyl acetate, that is the range of 0 to about 45% substitution of acetate groups by hydroxyl groups, is kept below about 1.0% of the alcoholysis or reaction mixture no troublesome jelly-like, pasty mass stage will result as the alcoholysis proceeds into and through the about 45% to about 75% replacement range which is the range in which the trouble with gel formation takes place.

In a preferred modification of our invention two reaction vessels are used in series for carrying out the reaction in a continuous manner, the effluent from the first reaction vessel flowing into the second and the effluent from the latter being treated to recover polyvinyl alcohol therefrom. A solution of polyvinyl acetate in methanol containing for example about 33% by weight of polyvinyl acetate is continuously passed into the first reaction vessel, together with a methanol solution of sodium methylate which serves as a catalyst, the proportion of catalyst being equal to about 0.5% by weight of the polyvinyl acetate fed and about 0.15% by weight of the reaction mixture. The polyvinyl acetate is fed at such a rate into the first reaction vessel that it at no time constitutes more than about 1% by weight of the contents in this vessel and preferably never exceeds a concentration of about 0.5%. The rate of feed of the polyvinyl acetate must be approximately in proportion to the rate of alcoholysis through the gel phase to maintain the desired low concentration of said polyvinyl acetate. The first reaction vessel is heated to the boiling point of the reaction mixture by any suitable means such as a steam jacket and the contents of the reaction vessel are continuously stirred. The reaction mixture is permitted to flow out from the reaction vessel from a point near the top and thence into the top of the second reaction vessel which likewise is heated to the boiling point of the reaction mixture and preferably is continuously stirred. The resulting slurry of polyvinyl alcohol is removed from the bottom of the second vessel at such rate as to keep the vessel full.

The reaction is more than 90% completed in the first reaction vessel and the effluent therefrom is a slurry of polyvinyl alcohol. In the second vessel the reaction is completed and the slurry removed therefrom is substantially free from unreacted polyvinyl acetate. The suspension of solid polyvinyl alcohol in either vessel will preferably not exceed about 25% by weight of the effluent so that the suspension or slurry is easily manageable.

The vapors from the boiling mixture in the two reaction vessels may be led through suitable pipes to a condenser, the condensate consisting of a mixture of methanol, methyl acetate and associated impurities. The condensate is preferably not returned to the reaction vessels, but is distilled to recover separately methanol and methyl acetate, or otherwise disposed of as may be desired.

Effluent from the second reaction vessel is filtered to remove suspended polyvinyl alcohol therefrom. The resulting filtrate consists of methanol together with a fraction or up to substantially all of the methyl acetate formed by the alcoholysis reaction. If no vapors are removed from the reaction mixture the filtrate from the effluent is generally not recycled because this would lead to unnecessary dilution. If, on the other hand, solvent vapors are removed then a portion of the filtrate may be recycled, the proportion being related to the amount of methyl acetate removed by evaporation being such that there will be no excessive build up or accumulation of methyl acetate in the reaction system or mixture.

In carrying out the above procedure for the alcoholysis of polyvinyl acetate with methanol at about atmospheric pressure, the temperature in the two reaction vessels will vary between about 53.5° C. which is the atmospheric boiling point of the methanol-methyl acetate binary and 64.5° C. which is the atmospheric boiling point of pure methanol.

When an adequate proportion of the reaction solvents is removed from the reaction vessels by vaporization there is little or no color left behind and polyvinyl alcohol of high color quality is produced. The amount of solvent mixture of alcoholysis alcohol and its acetate ester removed by vaporization will be determined in part by the extent to which color forming materials produced by the alcoholysis are to be removed from the system. Between 10 to 30% of the solvent can be removed and the removal of 15 to 25% of the solvent in the reaction mixture has been found effective. Removal of much more than about 30% of the mixture by evaporation will make the resultant slurry of the dispersed polyvinyl alcohol in the liquid medium or solvent too difficult to manage for practical purposes. The polyvinyl alcohol thus produced is a substantially completely hydrolyzed grade, containing not more than about 5% of the original unsaponified acetate groups. The degree of hydrolysis can be increased by increasing catalyst concentration and, to some extent, by decreasing the rate of flow through the reaction vessels; and products better than 99% saponified can readily be obtained. We generally prefer to carry out the reaction to such extent that less than 2% of the original acetate groups in the polyvinyl acetate remain in the product.

We have discovered that smooth, easy operation with low power consumption and good product quality is possible by the proposed mode of operation. Gel formation is always troublesome when the concentration of the polyvinyl acetate and the partially hydrolyzed solvent soluble ester undergoing alcoholysis is much above 1% of the total reaction mixture. The gel formed creates a highly viscous mixture which must not be allowed to set up hard if a useful product is desired. The use of low concentrations of polyvinyl acetate requires a high rate of alcoholysis if the process is not to become too time consuming. High rate of alcoholysis is favored by high temperature, high concentration of catalyst and low concentration of methyl acetate. All three of these factors can be provided for simultaneously or any two of them may be sufficiently effective provided that the solvent soluble polyvinyl acetate concentration be kept low to avoid gel formation. And if gel does form with polyvinyl acetate in the 1% concentration range the gel will be fleeting and tenuous so that simple agitation will suffice to break it up. Indeed, we have observed that under these conditions any gel formation will be accompanied by scarcely any viscosity increase of the reaction liquid over and above that of the component liquids.

In practicing our invention we maintain in the reaction mixture a sufficiently large proportion of methanol so that the reaction mixture and the resulting product are liquid slurries of polyvinyl alcohol which may be readily stirred and flowed in liquid form. In order to maintain this liquid condition, gel formation must be prevented. As the methanol-soluble polyvinyl acetate changes to the methanol-insoluble polyvinyl alcohol, it passes through a stage where it forms a methanol-containing gel. If gel formation is not properly inhibited, the whole mass may set up into a gel in the reactor or in large masses of gel, despite the employment of large excesses of methanol or any increase in rate of agitation. We have found that gel formation can be inhibited without using unduly large proportions of methanol, so that the reaction mixtures are maintained at all times as easily stirred and readily flowable slurries, by properly adjusting the catalyst concentration, and by keeping the polyvinyl acetate below about 1% by weight of the reaction mass. To obtain this result, we have found that the catalyst concentration in the reaction mixture must not fall below about 0.1% by weight, i. e. about 0.1% of the weight of the liquid portion of the reaction mixture. If the catalyst concentration should fall much below about 0.05% or lower, gel formation tends to occur. Generally we prefer a catalyst concentration of 0.2 to 0.5%. If desired, the catalyst concentration may be as high as around 5%. As the catalyst concentration is increased the product tends to become discolored; and to avoid excessive discoloration, the catalyst concentration should not exceed 5% and preferably should be maintained below about 1% of the liquid portion of the reaction mixture. We have also found that gel formation is effectively repressed if the concentration of the solvent soluble polyvinyl acetate undergoing alcoholysis is maintained in the preferred range of about 0.1 to 0.5% by weight of the reaction mass. The most effective concentration of the polyvinyl acetate is about 0.3%. Gel formation becomes increasingly difficult to control at solvent soluble polyvinyl acetate concentrations in excess of 1%, especially in excess of about 5% of the reaction mass.

The proportion of methanol introduced into the reaction system may be as low as about 0.6 part by weight for each part of polyvinyl acetate reacted. Any larger amounts of methanol may be used as desired, e. g. up to 16 parts for each part by weight of polyvinyl acetate reacted. We prefer to employ around 2 to 4 parts by weight of methanol for each part by weight of polyvinyl acetate reacted. In any case, the ratio of methanol to polyvinyl acetate preferably is adjusted to insure a sufficient excess of methanol at the end of the reaction to provide a liquid slurry of polyvinyl alcohol, taking into account the amount of methanol which reacts and the amount which boils off from the reaction mixture. The excess of methanol may be varied to produce thin or thick slurries of the product, as desired. If desired, the methanol may be added part to the first reaction vessel and part to the second, but generally we prefer to add it all to the first vessel.

The catalyst employed in our process is an alkali metal alcoholate, preferably sodium methylate ($CH_3ONa$). The catalyst preferably is added in the form of an anhydrous methanol solution, preferably made by reacting sodium with an excess of anhydrous methanol. Any alkali metal alcoholate may be used as catalyst, e. g. potassium ethylate, lithium butyrate, sodium propylate, sodium butylate, sodium decylate and the like.

The catalyst should, however, be added in anhydrous form and is effective in our process only when the reaction mixture is substantially anhydrous. Thus, an alkali metal alcoholate made by reacting the alkali metal hydroxide cannot be employed, as this will contain water, as shown by the equation:

$$NaOH + CH_3OH \rightarrow CH_3ONa + H_2O$$

If water is present in the reaction mixture, whether introduced with the alcoholate catalyst or otherwise, at our reaction temperature the catalyst is rapidly destroyed by saponification of methyl acetate, thus:

$$NaOCH_3 + H_2O + CH_3COOCH_3 \rightarrow CH_3COONa + 2CH_3OH$$

Hence, whereas alkali metal hydroxides and other alkalies capable of reacting with alcohols to form water, are effective as catalysts for alcoholysis of polyvinyl acetate at relatively low temperatures below about 40° C., they cannot be utilized in our process which is operated at boiling temperatures. In our process, the catalyst is anhydrous alkali metal alcoholate. If water from any source is present in the reaction mixture, an excess of the anhydrous alcoholate must be added. Such excess is calculated on the basis that one mole of water will destroy one mole of the alcoholate catalyst.

In place of two reaction vessels, the continuous operation may be practiced with any desired number of reaction vessels connected in series, e. g. from two to ten vessels, or the equivalent thereof. A single reaction vessel can be used for continuous operation if desired, but a plurality is preferred. In any case, we prefer to operate so that the product effluent is substantially free from dissolved unreacted polyvinyl acetate, the product consisting substantially entirely of a slurry of polyvinyl alcohol in a mixture of methanol and methyl acetate. Such result can be obtained with a single reaction vessel which is sufficiently elongated or otherwise so designed that incoming polyvinyl acetate does not mix with effluent product. Various forms of apparatus for this purpose will be apparent to the skilled chemical engineer. In any case, to realize the full advantages of our invention, the reaction mixture should be maintained at or near the boiling point so long as it contains any appreciable amount of unreacted polyvinyl acetate. The reaction mixture also must be kept in agitation or other suitable motion must be provided to maintain the solid polyvinyl alcohol particles in suspension.

After filtering off, or otherwise removing the solid polyvinyl product, the residual liquid may or may not be recycled to one or more of the reaction vessels, as desired and as determined by the quality of the product to be made. As this liquid is an anhydrous mixture of methanol which will contain a relatively small amount of methyl acetate if the vapors from the boiling reaction mixture have been effectively removed, we prefer to recycle it to serve as reaction solvent. Although this results in introducing some methyl acetate into the reaction mixture, which reaction by-product we remove by boiling off, such recycling does not defeat the purpose of the boiling, since the amount recycled always will be smaller than the amount boiled off. For example, in a typical operation condensation of the vapors boiled off yielded a liquid containing 43% methyl acetate and 57% of methanol, while the recycled filtrate contained 15% methyl acetate and 85% methanol. In this operation, despite the recycle of the filtrate, the boiling off of methyl acetate from the reaction mixture maintained a sufficiently low methyl acetate concentration to produce high quality polyvinyl alcohol in good yield, with relatively low catalyst consumption. If, on the other hand, the invention is practiced with little or no removal of vapors from the reaction vessels then recycling of the filtrate after polyvinyl alcohol removal will generally not be advantageous since the reaction mixture would become undesirably diluted.

While we prefer to carry out the alcoholysis reaction in a continuous manner, as described above, the invention is not so restricted, but may be adapted to batchwise operation. In any case, it is essential to maintain the reaction mixture at or near the boiling temperature and, if desired, continuously remove the resulting vapors, while maintaining in the mixture sufficient of the hydrolytic alcohol to react with the solvent soluble polyvinyl acetate which latter must not be in excess of about 1% of the reaction mass at any time, and to maintain the precipitated polyvinyl alcohol in the form of a slurry, and sufficient catalyst so that by these means gell formation be prevented or minimized. For example, we may heat to boiling methanol containing anhydrous dissolved catalyst, then continuously or intermittently add alcoholysis catalyst and methanol solution of polyvinyl acetate with continuous agitation of the mixture, while removing vapor from the boiling mixture. As the vapors are removed, the added components contain sufficient methanol to maintain the resulting polyvinyl alcohol in finely divided form suspended in the liquid. If desired, hot methanol vapors may be passed into the reaction mixture to furnish heat and aid in methyl acetate distillation. After the desired amount of polyvinyl acetate has been added and never in excess of 1% of solvent soluble polyvinyl acetate by weight of the entire reaction mixture, the reaction mixture preferably is stirred and heated further, until a test shows the substantial absence of unreacted polyvinyl acetate. The resulting slurry then may be filtered to recover the solid product.

While we prefer to carry out the reaction at about atmospheric pressure, sub-atmospheric or super atmospheric pressures may be employed, if desired, since any reasonable changes in pressure have little or no effect on the results obtained.

It is not necessary that the polyvinyl acetate be fed as a solution in the hydrolytic alcohol. Instead the hydrolytic alcohol and solid polyvinyl acetate may be fed to the vessel separately. For this purpose, the preferable form of the polyvinyl acetate is small beads under 8-mesh in size, which readily dissolves in the alcohol.

Our invention is not restricted to reacting methanol with polyvinyl acetate but may be utilized to react any alcohol having 1 to 4 carbon atoms with polyvinyl acetate or with other polymerized vinyl esters of carboxylic acids, which acids contain from 1 to 4 carbon atoms. Examples of suitable hydrolytic alcohols are: methanol, ethanol, the isomeric propanols and the isomeric butanols. Examples of the polyvinyl esters are polyvinyl formate, polyvinyl acetate, the polyvinyl propionates and the polyvinyl butyrates which are vinyl esters of saturated carboxylic acids. If desired a plurality of alcohols may be reacted with a polyvinyl ester or a mixture of polyvinyl esters, or a mixture of polyvinyl esters may be reacted with a single alcohol.

If desired, other liquids may be added to the reaction mixture to serve as reaction solvents. Such liquids must be non-solvents for the resulting polyvinyl alcohol, non-reactive towards the ingredients of the reaction mixture and miscible with the alcohol and the alcoholic solution of the polyvinyl ester. Such added liquids preferably, but not necessarily, should be solvents for the polyvinyl ester. A non-solvent for the polyvinyl ester is employed, only provided it will permit solution of the polyvinyl ester in the reaction mixture to the extent of about 1% by weight of the mixture.

We claim:

1. A process which comprises reacting the polymerized vinyl ester of a saturated carboxylic acid containing 1 to 4 carbon atoms with a hydrolytic alcohol containing 1 to 4 carbon atoms in the presence of an alkali metal alcoholate catalyst under substantially anhydrous conditions, maintaining said alcoholate concentration between about 0.05 to 5% by weight of the reaction mixture, maintaining the concentration of said polyvinyl ester between about 0.1 and 1% by weight of said reaction mixture, said polyvinyl ester present in said reaction mixture being soluble therein, and the polyvinyl alcohol produced being insoluble therein, removing from said reaction mixture the resulting solvent insoluble polyvinyl alcohol and carboxylic acid ester and adding hydrolytic alcohol to said reaction mixture at a rate so as to maintain said polyvinyl alcohol in an easily manageable suspension.

2. Claim 1 further characterized in that the polyvinyl ester is polyvinyl acetate.

3. Claim 2 further characterized in that the hydrolytic alcohol is methanol.

4. Claim 1 further characterized in that the polyvinyl ester is polyvinyl acetate, the hydrolytic alcohol is methanol, the catalyst is sodium methylate.

5. Claim 4 further restricted to maintaining a concentration of polyvinyl acetate between about 0.2 to 0.5% in the reaction mixture.

6. Claim 5 further restricted to maintaining the catalyst concentration between about 0.2 to 0.5%.

7. A process for reacting polyvinyl acetate with methanol to produce polyvinyl alcohol which comprises adding polyvinyl acetate to a substantially anhydrous liquid reaction medium comprising methanol, methyl acetate, suspended polyvinyl alcohol and sodium methylate at about the boiling temperature of said reaction medium, said polyvinyl acetate being added at a rate to maintain a concentration of polyvinyl ester below about 1% by weight of the reaction mixture, said polyvinyl ester present in said reaction mixture being soluble therein, and the polyvinyl alcohol produced being insoluble therein, adding methanol to the mixture at a rate to maintain the polyvinyl alcohol formed in an easily manageable suspension, adding sodium methylate to maintain a concentration above about .1% by weight of the solvent portion of the reaction mixture, agitating the mixture and removing liquid effluent therefrom to separate the polyvinyl alcohol produced.

8. A process for producing polyvinyl alcohol by the alcoholysis of a polymerized vinyl ester of a saturated carboxylic acid containing 1 to 4 carbon atoms which comprises adding the polyvinyl ester to a liquid reaction medium comprising hydrolytic alcohol containing 1 to 4 carbon atoms, carboxylic acid ester produced by the alcoholysis, an alkali metal alcoholate catalyst and suspended polyvinyl alcohol, said polyvinyl ester being added at a rate to maintain a concentration of polyvinyl ester between about 0.1 and 1% by weight of the reaction medium, said polyvinyl ester present in said reaction mixture being soluble therein, and the polyvinyl alcohol produced being insoluble therein, said hydrolytic alcohol being added at a rate to maintain the polyvinyl alcohol formed in an easily manageable suspension, said catalyst being maintained at a concentration by weight of the solvent portion of the reaction medium between 0.05 to 2%, agitating the reaction mixture, heating the mixture at its boiling point and removing therefrom evolved vapors, said vapors comprising between about 10% and 30% by weight of said reaction mixture, removing liquid effluent containing suspended polyvinyl alcohol from the reaction mixture and recycling to the reaction mixture liquid separated from the suspension of polyvinyl alcohol in said effluent and said effluent containing between about 90% and 70% by weight of said reaction mixture.

9. A process according to claim 8, wherein the polyvinyl ester, the hydrolytic alcohol and the alkali metal alcoholate are respectively polyvinyl acetate, methanol and sodium methylate.

10. A process according to claim 9 wherein the polyvinyl acetate is maintained at a concentration between about 0.2 and 0.5% by weight of the reaction medium and the sodium methylate is maintained at a concentration by weight of the solvent portion of the reaction medium between about 0.1 and 0.5%.

11. A process which comprises reacting the polymerized vinyl ester of a saturated carboxylic acid containing 1 to 4 carbon atoms with a hydrolytic alcohol containing 1 to 4 carbon atoms in the presence of an alkali metal alcoholate under substantially anhydrous conditions, maintaining the concentration of said polyvinyl ester below about 1% by weight of the reaction mixture, said polyvinyl ester present in said reaction mixture being soluble therein, and the polyvinyl alcohol produced being insoluble therein, maintaining the concentration of said alcoholate at not less than about 0.1% by weight of the reaction mixture, maintaining the reaction mixture at its boiling point and removing therefrom evolved vapors, so as to remove the ester of said carboxylic acid with hydrolytic alcohol from the reaction mixture while agitating said mixture and maintaining therein sufficient liquid non-solvent for the resulting alcoholysis product to maintain the latter in a state of subdivision in suspension in said mixture.

12. A process which comprises reacting polyvinyl acetate with methanol in the presence of an alkali metal alcoholate under substantially anhydrous conditions, maintaining the concentration of said polyvinyl acetate below about 1% by weight of the reaction mixture, said polyvinyl acetate present in said reaction mixture being soluble therein, and the polyvinyl alcohol produced being insoluble therein, maintaining the concentration of said alcoholate at not less than about 0.1% by weight, maintaining the reaction mixture at its boiling point and removing therefrom evolved vapors, so as to remove methyl acetate from the reaction mixture while agitating said mixture and maintaining therein sufficient methanol to maintain the resulting polyvinyl alcohol in a state of subdivision in suspension in said mixture.

13. The process which comprises continuously flowing together one part by weight of the polymerized vinyl ester of a saturated carboxylic acid containing 1 to 4 carbon atoms, at least 0.6 part by weight of an alcohol containing 1 to 4 carbon atoms and sufficient alkali metal alcoholate to maintin a concentration thereof in the resulting mixture not less than about 0.1% by weight, maintaining the concentration of said polyvinyl ester below about 1% by weight of said resulting mixture, said polyvinyl ester present in said resulting mixture being soluble therein, and the polyvinyl alcohol produced being insoluble therein, under substantially anhydrous conditions, heating and stirring said mixture to its boiling point, continuously removing evolved vapors from the boiling mixture so as to remove the ester of said carboxylic acid with said alcohol from the reacting mixture and recovering therefrom dispersed solid polyvinyl alcohol.

14. A process for the production of the alcoholysis product of the polymerized vinyl ester of a saturated carboxylic acid containing 1 to 4 carbon atoms which comprises continuously flowing said polymerized ester and an alcohol containing 1 to 4 carbon atoms in the proportions of not less than 0.6 part by weight of said alcohol to one part by weight of said polymerized ester into contact with an amount of alkali metal alcoholate equal to not less than about 1% by weight of the resulting mixture, maintaining the concentration of said polyvinyl ester below about 1% by weight of said resulting mixture, said polyvinyl ester present in said resulting mixture being soluble therein, and the polyvinyl alcohol produced being insoluble therein, under substantially anhydrous conditions, at a temperature sufficiently high to boil the mixture, while agitating said mixture and continuously removing therefrom the resulting evolved vapors so as to remove the ester of said carboxylic acid with said alcohol from said mixture.

15. The process which comprises reacting polyvinyl acetate with methanol under substantially anhydrous conditions in the presence of sufficient excess methanol to form a slurry of the solid reaction product and an amount of sodium methylate equal to not less than about 0.1% by weight of the reaction mixture, maintaining the concentration of said polyvinyl acetate below about 1% by weight of said reaction mixture, said polyvinyl acetate present in said reaction mixture being soluble therein, and the polyvinyl alcohol produced being insoluble therein, agitating the reaction mixture and distilling by-product methyl acetate therefrom during the course of the reaction.

16. The process which comprises continuously flowing into a reaction space polyvinyl acetate and methanol, in the proportion of not less than 0.6 part by weight of methanol to one part by weight of polyvinyl acetate, together with sufficient alkali metal methylate to maintain a concentration thereof in the resulting mixture of not less than about 0.1% by weight, flowing said polyvinyl acetate into said reaction space at a rate to maintain the concentration of said polyvinyl acetate below about 1% by weight of said resulting mixture, said polyvinyl acetate present in said resulting mixture being soluble therein, and the polyvinyl alcohol produced being insoluble therein, under substantially anhydrous conditions, stirring and heating said mixture to its boiling point, continuously removing evolved vapors of methyl acetate and methanol from the boiling mixture and continuously flowing from said space a slurry of dispersed polyvinyl alcohol.

17. A process for the production of polyvinyl alcohol which comprises continuously flowing polyvinyl acetate and methanol in the proportion of not less than 0.6 part by weight of methanol to one part by weight of polyvinyl acetate into contact with an amount of alkali metal alcoholate equal to not less than about 0.1% by weight of the resulting mixture, said polyvinyl acetate being maintained in said resulting mixture at a concentration below about 1% by weight thereof, said polyvinyl acetate present in said resulting mixture being soluble therein, and the polyvinyl alcohol produced being insoluble therein, under substantially anhydrous conditions, at a temperature sufficiently high to boil the mixture, while agitating said mixture and continuously removing therefrom the resulting evolved vapors containing methyl acetate.

18. A process for the production of polyvinyl alcohol which comprises continuously flowing polyvinyl acetate and methanol in the proportion of about 2 to 4 parts by weight of methanol to one part by weight of polyvinyl acetate into contact with an amount of sodium methylate equal to about 0.2 to 0.5% by weight of the liquid portion of the resulting reaction mixture, said polyvinyl acetate being added at a rate to maintain a concentration below about 1% by weight thereof in said reaction mixture, said polyvinyl acetate present in said reaction mixture being soluble therein, and the polyvinyl alcohol produced being insoluble therein, under substantially anhydrous conditions, at a temperature sufficiently high to boil the mixture, while agitating said mixture and continuously removing therefrom the resulting evolved vapors containing methyl acetate.

References Cited in the file of this patent

UNITED STATES PATENTS

| | | |
|---|---|---|
| 2,266,996 | Scott et al. | Dec. 23, 1941 |
| 2,481,388 | Bryant | Sept. 6, 1949 |
| 2,502,715 | Germain | Apr. 4, 1950 |

FOREIGN PATENTS

| | | |
|---|---|---|
| 642,531 | Germany | Mar. 8, 1937 |